US008764106B2

(12) United States Patent
Bigolin

(10) Patent No.: US 8,764,106 B2
(45) Date of Patent: Jul. 1, 2014

(54) BICYCLE SADDLE STRUCTURE COMPRISING MEANS FOR MOUNTING THE SADDLE ON A BICYCLE SEAT POST

(75) Inventor: Giuseppe Bigolin, Rossano Veneto (IT)

(73) Assignee: Selle Italia S.R.L., Casella d'Asolo (TV) (IT)

( * ) Notice: Subject to any disclaimer, the term of this patent is extended or adjusted under 35 U.S.C. 154(b) by 0 days.

(21) Appl. No.: 13/811,233

(22) PCT Filed: May 16, 2011

(86) PCT No.: PCT/IB2011/052141
§ 371 (c)(1),
(2), (4) Date: Jan. 18, 2013

(87) PCT Pub. No.: WO2012/010989
PCT Pub. Date: Jan. 26, 2012

(65) Prior Publication Data
US 2013/0119719 A1    May 16, 2013

(30) Foreign Application Priority Data
Jul. 22, 2010    (IT) ................................. VI2010A0202

(51) Int. Cl.
*B62J 1/00* (2006.01)
(52) U.S. Cl.
USPC ............. 297/215.14; 297/215.13; 297/215.15
(58) Field of Classification Search
CPC ...................................... B62J 1/00; B62J 1/08
USPC ........ 297/195.1, 215, 215.13, 215.14, 215.15
See application file for complete search history.

(56) References Cited

U.S. PATENT DOCUMENTS

| 5,295,727 | A  | * | 3/1994 | Kao ......................... 297/215.14 |
| 5,749,622 | A  | * | 5/1998 | Tseng ........................ 297/195.1 |
| 6,561,579 | B1 | * | 5/2003 | Weir ........................... 297/195.1 |
| 7,407,225 | B2 | * | 8/2008 | Bigolin ..................... 297/215.14 |
| 8,042,823 | B2 | * | 10/2011 | Cusack .......................... 280/283 |
| 2002/0166941 | A1 | * | 11/2002 | Dunlap .......................... 248/599 |
| 2010/0244509 | A1 | * | 9/2010 | Chang ...................... 297/215.15 |
| 2011/0210231 | A1 | * | 9/2011 | D'Aluisio ..................... 248/629 |

FOREIGN PATENT DOCUMENTS

| EP | 1816060 | 8/2007 |
| FR | 2854123 | 10/2004 |
| JP | 54140451 | 9/1979 |

* cited by examiner

*Primary Examiner* — Philip Gabler
(74) *Attorney, Agent, or Firm* — Themis Law

(57) ABSTRACT

An ergonomic saddle structure for bicycles and pedal machines comprises a shell (2) made of relatively rigid material, a pronged connection (15) anchorable on the lower part to the shell (2) and having a central body (16) with a slotted through hole (23) provided with flared or smoothed longitudinal edges (23'), connection means which comprise a fork (24) with a pair of lateral wings (25, 26) adapted to house the central body (16) and provided with respective cylindrical through openings (27, 28) as well as locking means for locking the fork (24) with respect to the pronged connection (15), which means comprise a first pair of inserts (30, 31) insertable in one portion of the through openings (27, 28), a second pair of inserts (39, 40) insertable in the remaining portion of the circular through openings (27, 28), are first screw means (37) operating on the first pair of inserts (30, 31) and second screw means (43) operating on the second pair of inserts (39, 40) in order to longitudinally and angularly lock the pronged connection (15) with respect to the fork (24).

9 Claims, 4 Drawing Sheets

BICYCLE SADDLE STRUCTURE COMPRISING MEANS FOR MOUNTING THE SADDLE ON A BICYCLE SEAT POST

TECHNICAL FIELD

The present finding is generally applicable in the technical field of supports for the human body and in particular has as object an ergonomic saddle structure for bicycles and pedal operated machines with improved connection means.

BACKGROUND ART

It is known that the saddles used in pedal operated vehicles, such as bicycles but also exercise bikes or wheel trainers for sports training, are formed by a shell made of a relatively rigid material, preferably covered by a relatively yielding padding layer that is intended to come into contact with the body of the user.

Generally, the shell comprises a rear portion intended to support the pelvis bones, in particular the ischial tuberosity with the surrounding muscular tissues, and a front portion intended to support the inguinal or pelvic zone of the user.

The rear portion is relatively enlarged and has a sufficient width for offering a relatively comfortable sitting, while the front zone must have a smaller width for allowing the user to extend the legs in a substantially vertical direction in order to carry out the pedal stroke.

From the patent EP 1816080, a saddle structure is known of the above-indicated type in which, in the lower part of the shell, a fork connection is provided for with a central body and with a slotted through hole provided with longitudinal edges. The shell can be connected to a seat post by means of connection means which comprise a fork with a pair of lateral wings provided with respective cylindrical through openings. The fork is locked with respect to the pronged connection by means of suitable locking means of screw type.

One drawback of this known saddle structure is that the screw locking means do not reliably and safely ensure the locking of the pronged connection with respect to the fork.

It follows that the user will not have absolute stability and might be subjected to movements in order to keep himself balanced.

DISCLOSURE OF THE INVENTION

The main object of the present invention is to overcome or at least limit the drawbacks mentioned above by obtaining an improved ergonomic saddle structure which has high functionality and comfort characteristics in a simple and economical manner.

One particular object is to provide a saddle structure with means of connection to a seat post with improved stability.

A further object is to provide a saddle structure which allows avoiding irregular functional dynamics that negatively affect the comfort and health of the users.

Still another object is to conceive an improved saddle structure which allows reducing the transverse bulk at the user's thighs to a minimum.

Such objects, as well as others which will be clearer below, are achieved by an improved ergonomic saddle structure, particularly for bicycles and pedal machines as described hereinafter.

In particular, the saddle structure according to the finding comprises a shell made of a relatively rigid material defining a longitudinal axis and a plane of symmetry that is substantially vertical, a pronged connection anchorable on the lower part to the shell and having a central body with a slotted through hole lying on the plane of symmetry provided with longitudinal edges, connection means intended to anchor the shell to a seat post of a frame of a bicycle or a pedal machine, wherein the connection means comprise a fork associable with a seat post and having a pair of lateral wings intended to house the central body of the pronged connection, the lateral wings being provided with respective cylindrical through openings with a transverse axis alignable with the slotted hole, and locking means for locking the fork with respect to the pronged connection.

The saddle structure is characterized in that the longitudinal edges of said slotted through hole are chamfered or flared, and that the locking means comprise a first pair of inserts insertable in a portion of said through openings and a second pair of inserts insertable in the remaining portion of said circular through openings. Also provided for are first screw means operating on the first pair of inserts in order to move them mutually closer along the transverse axis and to interact with the slotted through hole, and second screw means operating on the second pair of inserts in order to interact with the first pair of inserts and to facilitate their mutual moving away in substantially radial direction in a manner so as to lock the angular position of the fork connection with respect to the fork.

Due to such configuration, it is possible to ensure a locking stability of the saddle both in longitudinal and angular direction.

BRIEF DESCRIPTION OF THE DRAWINGS

Further features and advantages of the finding will appear more clearly in light of the detailed description of a preferred but not exclusive embodiment of an ergonomic saddle structure, illustrated as a non-limiting example with the aid of the enclosed drawing tables, in which.

DETAILED DESCRIPTION OF A PREFERRED EMBODIMENT

Figure 1:
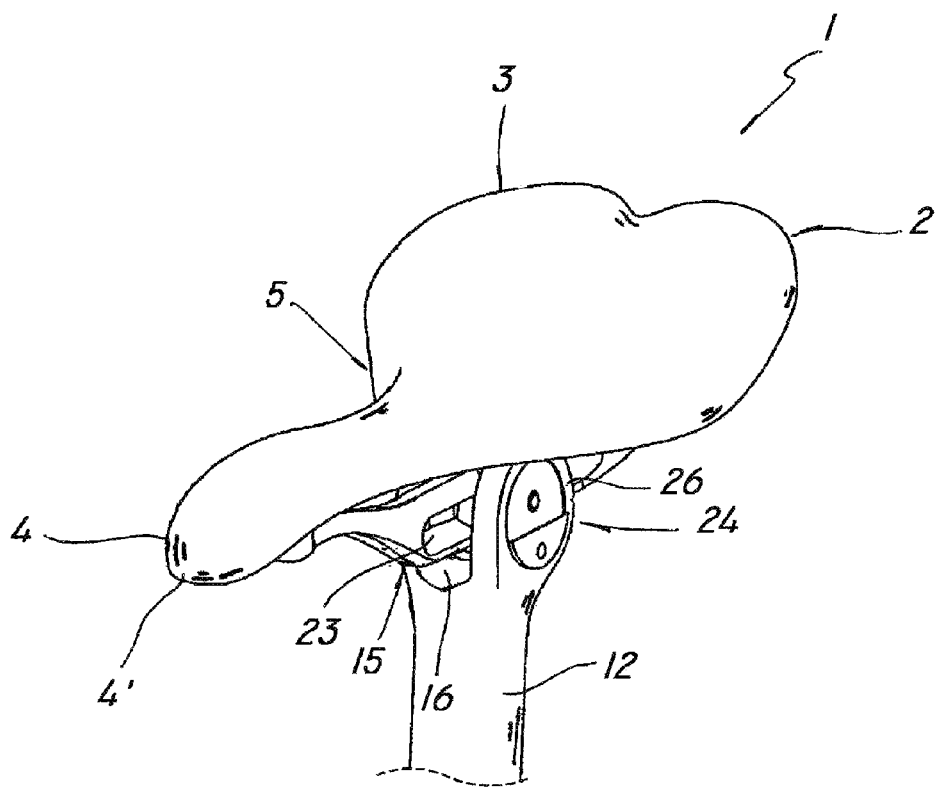
FIG. 1 is a top perspective view of a saddle structure according to the finding mounted on a tubular seat post.

With reference to the mentioned figures, the ergonomic saddle structure according to the invention, overall indicated with the reference number 1, can be anchored to a frame of a bicycle or pedal machine, such as an exercise machine or a stationary roller for outdoor and indoor bike training.

The saddle structure 1 essentially comprises a shell 2 made of a relatively rigid material, such as wood, metal, a thermosetting or thermoplastic resin, of epoxy, polyamide or polypropylene type, fairly loaded with particles or reinforced with fibers, having a longitudinal axis X coinciding with an axis of symmetry and a total length L, and a longitudinal plane of symmetry V passing through the axis X and substantially vertical.

The shell 2 typically comprises an enlarged rear portion 3, intended to support the lower ends of the ischiatic bones with a predetermined maximum width W and a tapered front portion 4 intended to support the pelvic zones of the user's body, having a rounded end edge 4'. The aforesaid rear 3 and front 4 portions are joined together in a continuous manner by an intermediate portion 5, preferably with minimum width lower than the first two.

The shell 2 is removably connected, by means of suitable connection means generically indicated with 11 (which will be described in more detail below), to a frame of a bicycle or similar machine, in particular to a tubular seat post 12 insertable in an upright of the aforesaid frame and preferably height-adjustable.

The tubular seat post 12 can be made of any high-strength material, e.g. carbon fiber, steel, aluminum or titanium.

As specifically shown in the figures, the connection means 11 comprise a variously shaped pronged connection 15 that can be removably coupled to the tubular seat post 12.

Figure 2:
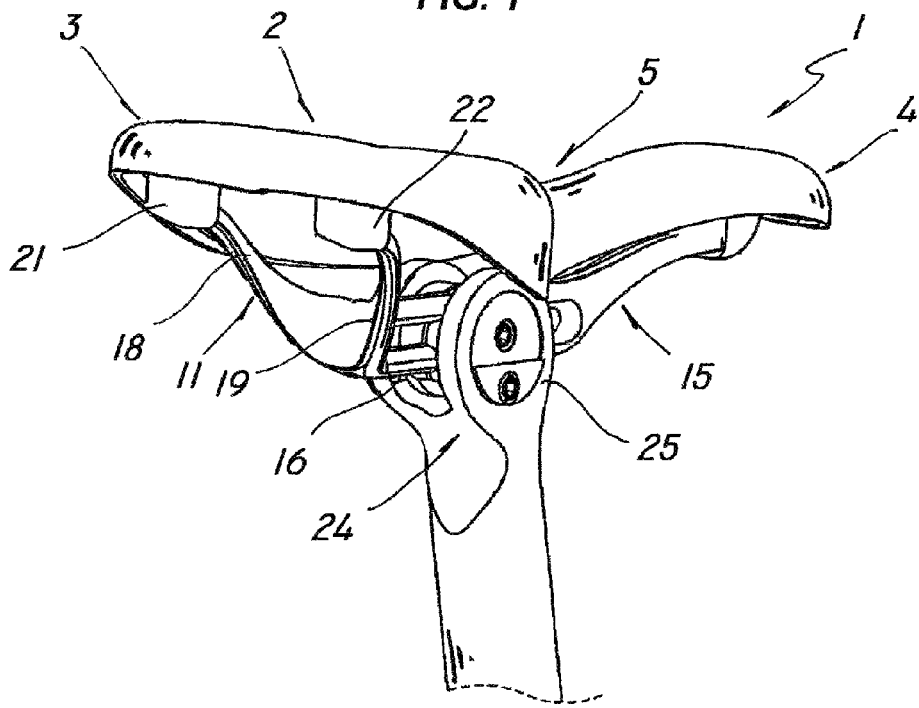
FIG. 2 is a rear perspective view of the saddle structure of FIG. 1.
Figure 3:
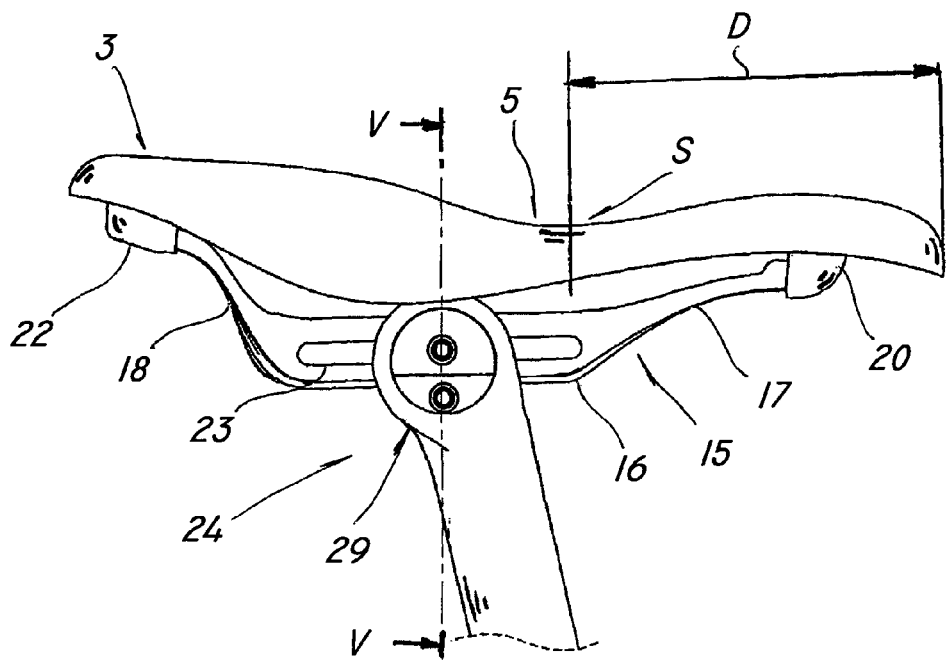
FIG. 3 is a side view of the saddle structure of FIG. 1.
Figure 4:
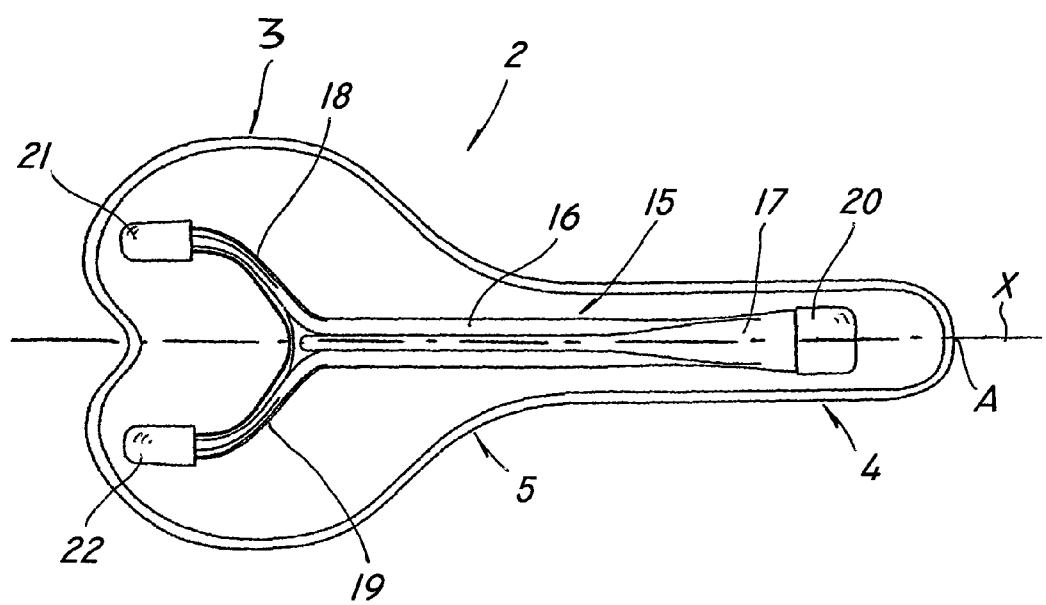
FIG. 4 is a plan view of the saddle structure of FIG. 1.
Figure 5:
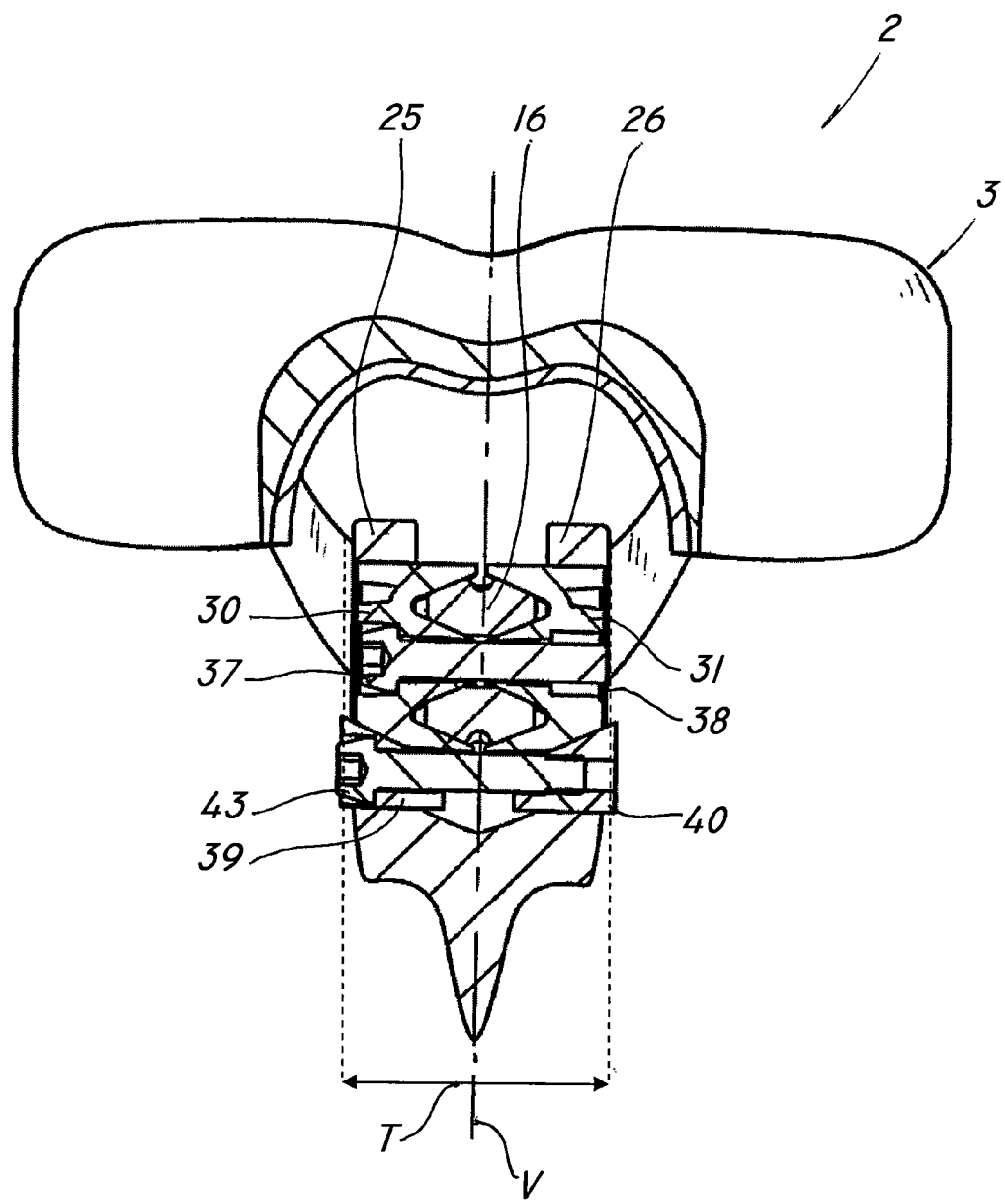
FIG. 5 is a section view of the saddle of FIG. 1 in assembled and locked state taken along the trace plane V-V of FIG. 3.
Figure 6:
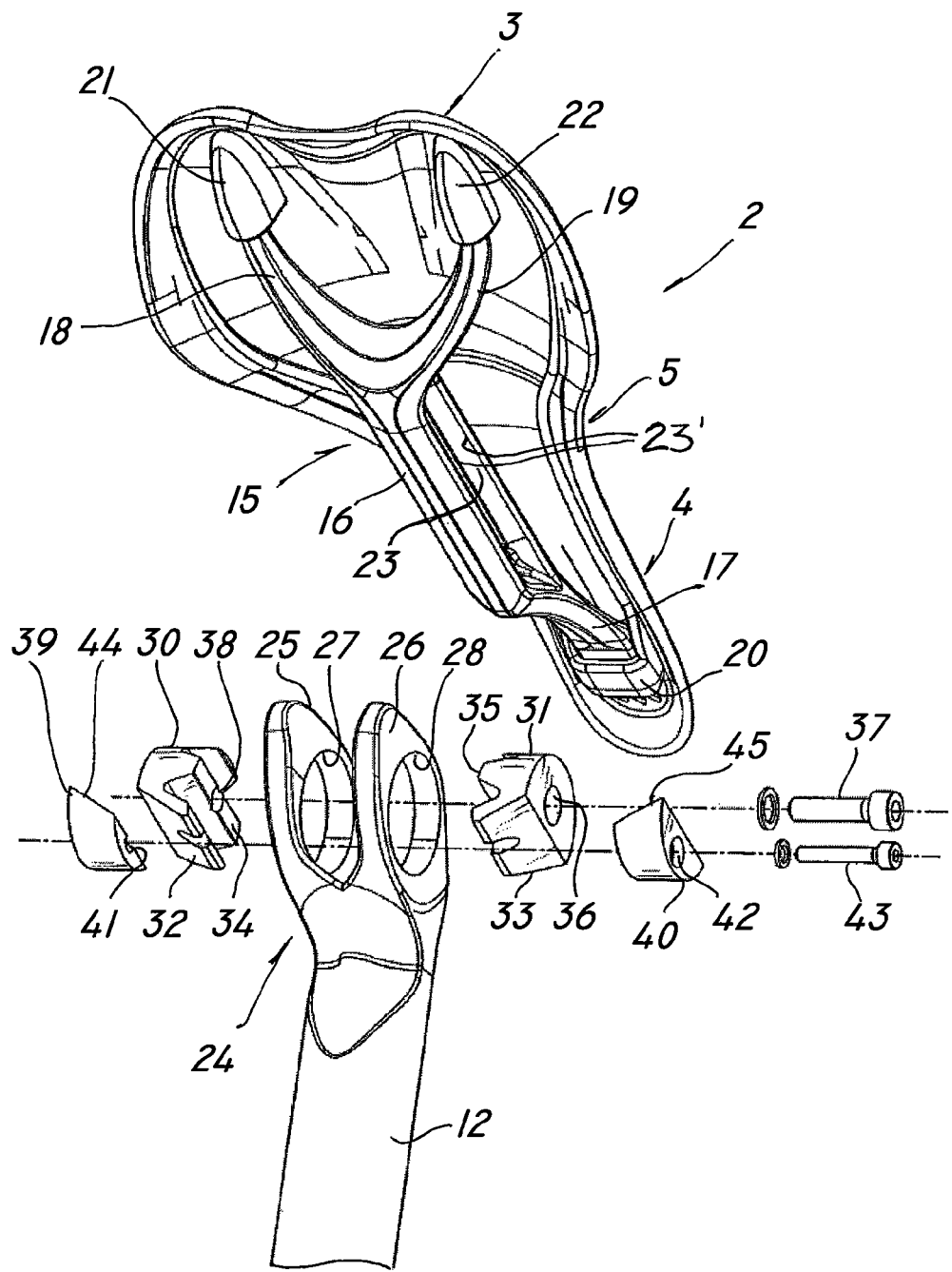
FIG. 6 is an exploded and disassembled bottom perspective view of the saddle structure of FIG. 1 in order to show the assembly and locking method thereof.

More specifically, the fork connection 15 has a substantially rectilinear central body 16 having a front prong 17 and a pair of substantially symmetrical upwardly directed rear prongs 18, 19 with respect to the central body 16, clearly visible in FIGS. 2, 5 and 6.

The prongs 17, 18, 19 are insertable in respective housings 20, 21, 22 obtained in the lower part of the shell 2, in a manner so as to achieve the coupling of the latter with the connection 15.

The central body 16 is substantially rectilinear with a substantially constant cross section, as is clearly illustrated in FIG. 5, and has a slotted through hole 23 which is extended in the longitudinal direction of the central body 16.

Suitably, the slotted hole 23 has flared or chamfered edges 23' in order to facilitate the locking, as will be more clearly illustrated below.

The fork connection 15 is connected to the seat post 12 by means of a fork 24 formed by a pair of lateral wings 25, 26. The wings 25, 26 have a distance between the inner surfaces sufficient to allow the insertion of the central body 16 and respective circular through openings 27, 28.

In order to lock the fork 24 with respect to the fork connection 15, locking means are provided for, generically indicated with 29, which comprise a first pair of cylindrical inserts 30, 31 insertable in the circular openings 27, 28 of the lateral wings 25, 26 of the fork in a manner so as to occupy a circular segment or portion thereof.

Both cylindrical inserts 30, 31 have a frontal portion shaped in a manner so as to obtain first tilted surfaces 32, 33 and frontal wedge-shaped formations 34, 35 engageable with the flared or smoothed edges of the slotted hole 23.

In addition, the cylindrical insert 31 has a central hole 36 for the passage of a first screw 37 screwable in an internally threaded hole 38 formed in the insert 30 passing through the slotted hole 23.

Thus, by operating on the locking screw 37, it will be possible to stabilize the longitudinal position of the fork connection 15 with respect to the fork 24.

In order to lock the saddle 2 with respect to the seat post 12, a second pair of locking inserts 39, 40 is provided for, it too essentially cylindrical, of size adapted to be inserted in the remaining portion with circular segment shape of the circular openings 27, 28, not occupied by the first pair of inserts 30, 31.

The inserts 39, 40 of the second pair have a corresponding internally smooth axial hole 41 and an internally threaded hole 42 for the passage and screwing of a second locking screw 43.

In addition, the inserts 39, 40 have second tilted surfaces 44, 45, with tilt corresponding with that of the tilted surfaces 32, 33 of the first pair of inserts 30, 31 in a manner so as to cooperate with the latter.

As a non-limiting example, the inserts 30, 31, 39, 40 can be made of metal materials, e.g. aluminum alloy or carbon fiber. In the first case, the surfaces can be pellet blasted and possibly anodically oxidized.

The screws 37, 43 can be made of steel or titanium.

Operatively, after having inserted the central body 16 of the fork connection 15 in the space of the fork 24 between the wings 25, 26, the first pair of inserts 30, 31 is inserted in the circular openings 27, 28, such inserts connected together by the first screw 37.

After having adjusted the position of the central body 16 in a longitudinal direction with respect to the fork 24, one proceeds with the tightening of the first screw 37 in a manner so as to lock the longitudinal position of the fork 24 with respect to the pronged connection 15.

Subsequently, the second pair of inserts 39, 40 is inserted in the part of the circular openings 27, 28 left free by the first inserts, such inserts 39, 40 locked together by means of the second screw 43 in a manner so as to cause their mutual approaching in the direction Y perpendicular to the slit 24.

The respective tilted surfaces 32, 33 and 44, 45 interact with each other in order to cause the mutual receding in a direction perpendicular to the direction Y and to lock the angular position of the fork connection 15 with respect to the fork 24.

Due to the conformation of the connection means 11 described above, it is possible to obtain an extremely stable coupling of the shell 2 to the tubular seat post 12 with minimum bulk, which allows reducing the width of the intermediate portion 5 of the shell 2 to a minimum.

The connection means described above have the advantage of being particularly compact, with extremely reduced transverse size.

For the sake of completeness, it is possible to provide for a cover and/or padding layer, of known type and not represented in the figures, associated with the upper surface of the shell 2.

With regard to that previously described, it is understood that the ergonomic saddle structure according to the finding achieves all the intended objects; in particular, it obtains the advantage of an optimal locking both longitudinally and angularly with respect to the seat post on which it is mounted.

The saddle structure according to the finding is susceptible to numerous modifications and variants, all falling within the inventive concept expressed in the enclosed claims.

All the details can be substituted with other technically equivalent elements, and the materials can be different as needed, without departing from the scope of the finding.

Even if the saddle structure was described with particular reference to the enclosed figures, the reference numbers used in the description and in the claims are used for improving the comprehension of the finding, and do not constitute any limitation of the claimed protective scope.

The invention claimed is:

1. A saddle structure, comprising:
   a shell (2) made of a relatively rigid material defining a longitudinal axis (X) and a substantially vertical plane of symmetry (V);
   a pronged connection (15) anchorable to a lower part of said shell (2) and having a central body (16) with a slotted through hole (23) provided with longitudinal edges (23');

connection means (11) intended to anchor said shell (2) to a seat post (12) of a frame of a bicycle or a pedal machine, wherein said connection means (11) comprise:

a fork (24) having a pair of lateral wings (25, 26) intended to house the central body (16) of said pronged connection (15), said lateral wings (25, 26) being provided with respective cylindrical through openings (27, 28) with a transverse common axis (Y) alignable with said slotted hole (25);

locking means (29) for locking said fork (24) with respect to said pronged connection (15);

wherein said longitudinal edges (23') of said slotted through hole (23) are chamfered or flared, and that said locking means (29) comprise a first pair of inserts (30, 31) insertable in a portion of said through openings (27, 28) and a second pair of inserts (39, 40) insertable in the remaining portion of said cylindrical through openings (27, 28), there being provided first screw means (37) operating on said first pair of inserts (30, 31) in order to mutually move them closer along said transverse axis (Y) and to interact with said longitudinal edges (23') of said slotted through hole (23) in a manner so as to lock the longitudinal position of said pronged connection (15) with respect to said fork (24), and second screw means (43) operating on said second pair of inserts (39, 40) in order to interact with said first pair of inserts (30, 31) and to facilitate their mutual receding in a substantially radial direction with respect to said transverse axis (Y) in a manner so as to lock the angular position of said pronged connection (15) with respect to said fork (24).

2. The saddle structure according to claim 1, wherein the inserts of said first pair (30, 31) and the inserts of said second pair (39, 40) are substantially identical to each other and at least partially cylindrical.

3. The saddle structure according to claim 1, wherein the inserts (30, 31) of said first pair have frontal wedge-shaped formations (34, 35) adapted to be engaged in the flared or chamfered edges of said slotted through hole (23) on opposite sides of said plane of symmetry (V) in order to lock the longitudinal position of said fork (24) with respect to said fork connection (15).

4. The saddle structure according to claim 1, wherein the inserts (30, 31) of said first pair have, at said frontal wedge-shaped formations (34, 35), respective axial holes (36, 38) for the passage of a first locking screw (37).

5. The saddle structure according to claim 4, wherein one (38) of said axial holes formed in one of the inserts (30) of said first pair is internally threaded in order to allow the screwing of said first screw (37) after having crossed through said slotted through hole (23) and the other axial hole (36) formed in the other (31) of the inserts of said first pair, in order to lock said fork (24) with respect to said fork connection (15).

6. The saddle structure according to claim 4, wherein the inserts of said second pair (39, 40) have second tilted surfaces (44, 45) adapted to interact with said first tilted surfaces (32, 33) of the inserts (30, 31) of said first pair.

7. The saddle structure according to claim 6, wherein the inserts (44, 45) of said second pair have respective through holes (41, 42) substantially parallel to the through holes of said first pair of inserts (30, 31) for the passage of a second locking screw (43).

8. The saddle structure according to claim 7, wherein one of the through holes (41) of one of the inserts (39) of said second pair is internally threaded in order to allow the screwing of said second locking screw (43) passing through the other substantially smooth axial hole (42) formed in the other (40) of the inserts of said second pair, in a manner such that upon screwing said second screw (43), the radial mutual sliding is facilitated of the inserts of said first pair (30, 31) and of said second pair (39, 40) along the respective first (32, 33) and second (44, 45) tilted surfaces, and the locking of said inserts (30, 31; 39, 40) is caused against the inner walls of said cylindrical through openings (27, 28) formed in the wings (25, 26) of said fork (24), in a manner so as to rotatably lock the latter with respect to said pronged connection (15).

9. The saddle structure according to claim 1, wherein the inserts (30, 31) of said first pair have respective first surfaces (32, 33) that are tilted with respect to said respective axial holes (36, 38).

* * * * *